(12) United States Patent
Lake

(10) Patent No.: US 6,277,141 B1
(45) Date of Patent: Aug. 21, 2001

(54) ORTHOPEDIC APPARATUS WITH FLUID BRAKING

(75) Inventor: Chester M. Lake, Ajax (CA)

(73) Assignee: Intra-Med Industries Inc., Concord (CA)

( * ) Notice: Subject to any disclaimer, the term of this patent is extended or adjusted under 35 U.S.C. 154(b) by 0 days.

(21) Appl. No.: 09/221,095

(22) Filed: Dec. 28, 1998

(51) Int. Cl.$^7$ ........................................................ A61F 5/00
(52) U.S. Cl. ........................... 606/243; 606/244; 606/245; 188/170
(58) Field of Search ................................. 188/170, 73.46, 188/73.43; 606/240–245; 5/614

(56) References Cited

U.S. PATENT DOCUMENTS

| | | | |
|---|---|---|---|
| 4,625,837 | * 12/1986 | Zimmer | 188/170 |
| 4,638,894 | * 1/1987 | Sitabkhan et al. | 188/170 |
| 4,655,200 | 4/1987 | Knight . | |
| 5,692,738 | * 12/1997 | DuVernay et al. | 269/82 |

* cited by examiner

Primary Examiner—Justine Yu
Assistant Examiner—Victor Hwang
(74) Attorney, Agent, or Firm—Blodgett & Blodgett, P.C.

(57) ABSTRACT

A hydraulic braking apparatus for an orthopedic apparatus having a main base which is adapted to rest on the floor and a support frame mounted on the main base. A head table, a center table, and an end table are mounted on the support frame. The end table is capable of sliding movement along the centerline of the frame, of rotative adjustment movement about the centerline, and of a swinging adjustment movement about a vertical pivotal axis passing through the centerline. An adjustment mechanism is located between the support frame and the end table to provide for the movements of the end table in adjustment and to hold the end table above the frame at the same general level as the head and center tables. The adjusting mechanism includes a cylindrical bar along which the end table is slidable and which provides for the rolling mode adjustment of the end table. The bar also pivots about a vertical axis at one end to provide for swinging adjustment movement of the end table. The hydraulic braking apparatus includes hydraulic caliper brakes for the rolling mode adjustment of the end table and the swinging mode adjustment of the end table and hydraulic control apparatus for selectively controlling the hydraulic caliper brakes.

1 Claim, 8 Drawing Sheets

ORTHOPEDIC APPARATUS WITH FLUID BRAKING

CROSS-REFERENCE TO RELATED APPLICATIONS

NOT APPLICABLE

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is directed in general to an orthopedic apparatus for supporting a patient in a plurality of bodily orientations. The invention is particularly directed to an improvement over the orthopedic apparatus disclosed in the commonly assigned U.S. Pat. No. 4,655,200, of Allan C. Knight. In the above-identified patent of Knight, the table which supports most of the weight the patient can be rotated and tilted in various planes. Each movement of the supporting brake is controlled by a hand activated braking mechanism which locks the table in place once a desired orientation has been achieved. Each braking mechanism is set and released by an elongated handle. Although the handles provide sufficient leverage to operate the braking mechanism, many individuals, particularly women, find it difficult to operate the braking mechanism, particularly over an extended period of time. The process of manually releasing and reapplying the braking mechanism is also time consuming. Once a desired orientation of the supporting table has been reached, it is important that the supporting table be fully secured in that position. The hand actuated brakes of the prior art tables are seldom secured to the same degree from one operator to another or even by the same operator during the course of a workday; particularly at the end of a workday where fatigue may be a factor. These and other difficulties experienced with the prior art devices have been obviated in novel way by the present invention.

It is, therefore, a principal object of the present invention to provide a power actuated braking mechanism in an orthopedic apparatus for the articulated table which supports the patient to achieve full and consistent securing of the table in a desired position.

Another object of the present invention to provide a hydraulic braking mechanism for the articulated patient supporting table of an orthopedic apparatus.

A further object of the invention is the provision of a hydraulic braking mechanism for the articulated patient supporting table of an orthopedic apparatus in which the table is braked against movement in the absence of a hydraulic pressure.

It is another object of the present invention to provide an orthopedic apparatus which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

BRIEF SUMMARY OF THE INVENTION

A hydraulic braking apparatus for an orthopedic apparatus having a main base which is adapted to rest on the floor and a support frame mounted on the main base, including a jack for adjusting the vertical height position of the frame above the base. A head table, a center table, and an end table are mounted on the support frame. The end table is capable of sliding movement along the centerline of the frame, of rotative adjustment movement about the centerline, and of a swinging adjustment movement about a vertical pivotal axis passing through the centerline.

More specifically, the support frame is provided with an integral abutment that holds the head and center tables at a level which is substantial distance above the frame. An adjustment mechanism is located between the support frame and the end table to provide for the movements of the end table in adjustment and to hold the end table above the frame at the same general level as the head and center tables. The adjusting mechanism includes a cylindrical bar along which the end table is slidable and which provides for the rolling mode adjustment of the end table. The bar also pivots about a vertical axis at one end to provide for swinging adjustment movement of the end table. The hydraulic braking apparatus includes hydraulic caliper brakes for the rolling mode adjustment of the end table and the swinging mode adjustment of the end table and hydraulic control apparatus for selectively controlling the hydraulic caliper brakes.

BRIEF DESCRIPTION OF THE DRAWINGS

The character of the invention, however, may be best understood by reference to one of its structural forms, as illustrated by the accompanying drawings, in which.

DETAILED DESCRIPTION OF THE INVENTION

Figure 1:
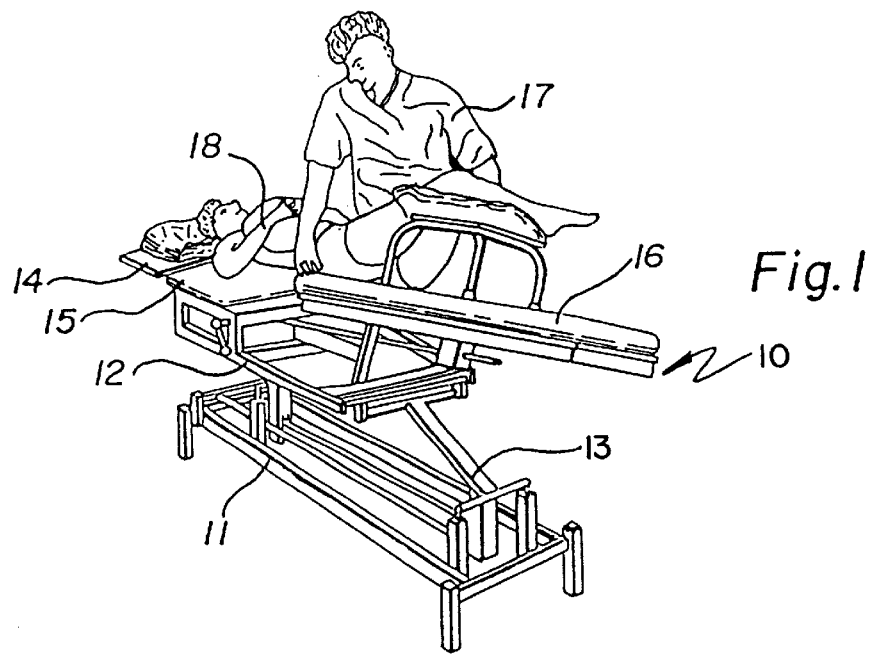
FIG. 1 is a perspective view of an orthopedic apparatus incorporating the principles of the present invention and shown in the use with a patient and a therapist.

Referring first to FIG. 1, wherein are best shown the general features of the invention, the orthopedic apparatus, generally indicated by the reference numeral 10, is shown as having a main base 11 that is adapted to rest on the floor and as having a support frame 12 mounted on the main base. A jack 13 is provided for adjusting the vertical height position of the frame 12 above the base 11. Mounted on the support frame 12 are a head table 14, a center table 15, and an end table 16. The end table is mounted on the support frame for sliding movement (slide mode) along the centerline of the frame, for rotative movement (roll mode) about the centerline, and for swinging movement (yaw mode) about a vertical pivotal axis passing through the centerline. A therapist 17 is shown manipulating a patient 18 who lies on the apparatus.

Figure 2:
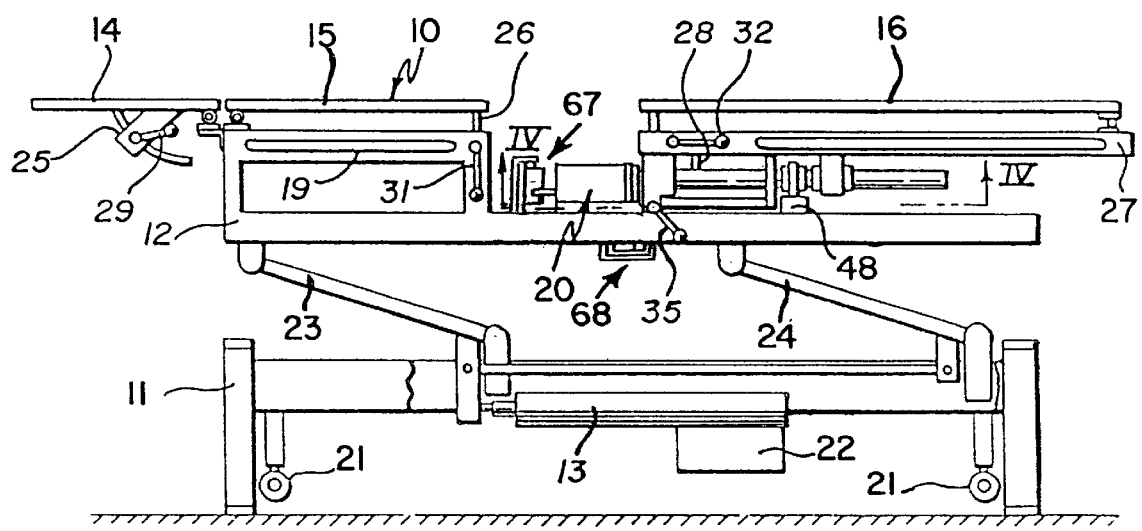
FIG. 2 is a front elevational view of an orthopedic apparatus.
Figure 3:
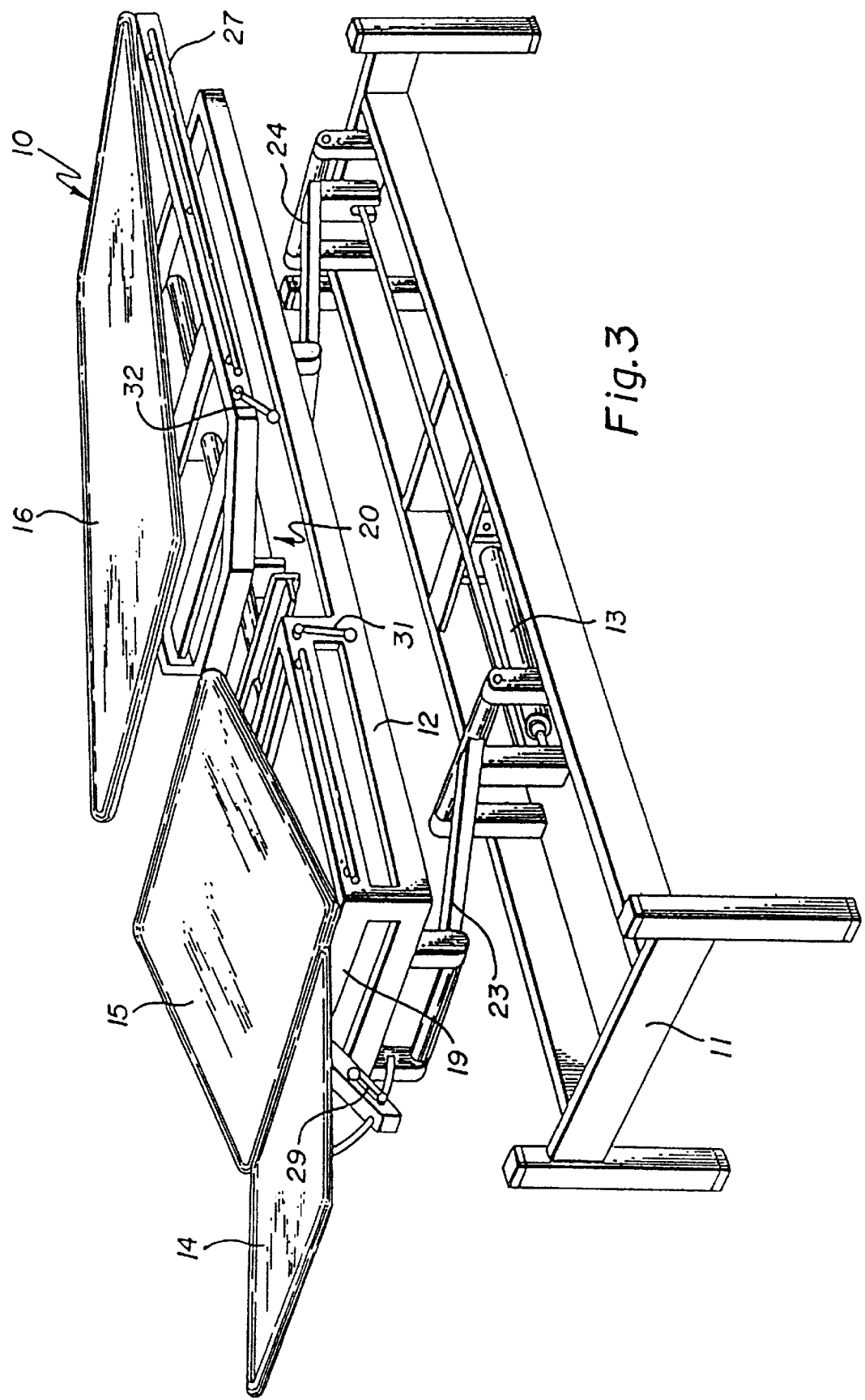
FIG. 3 is a perspective view of the orthopedic apparatus with portions removed.
Figure 4:
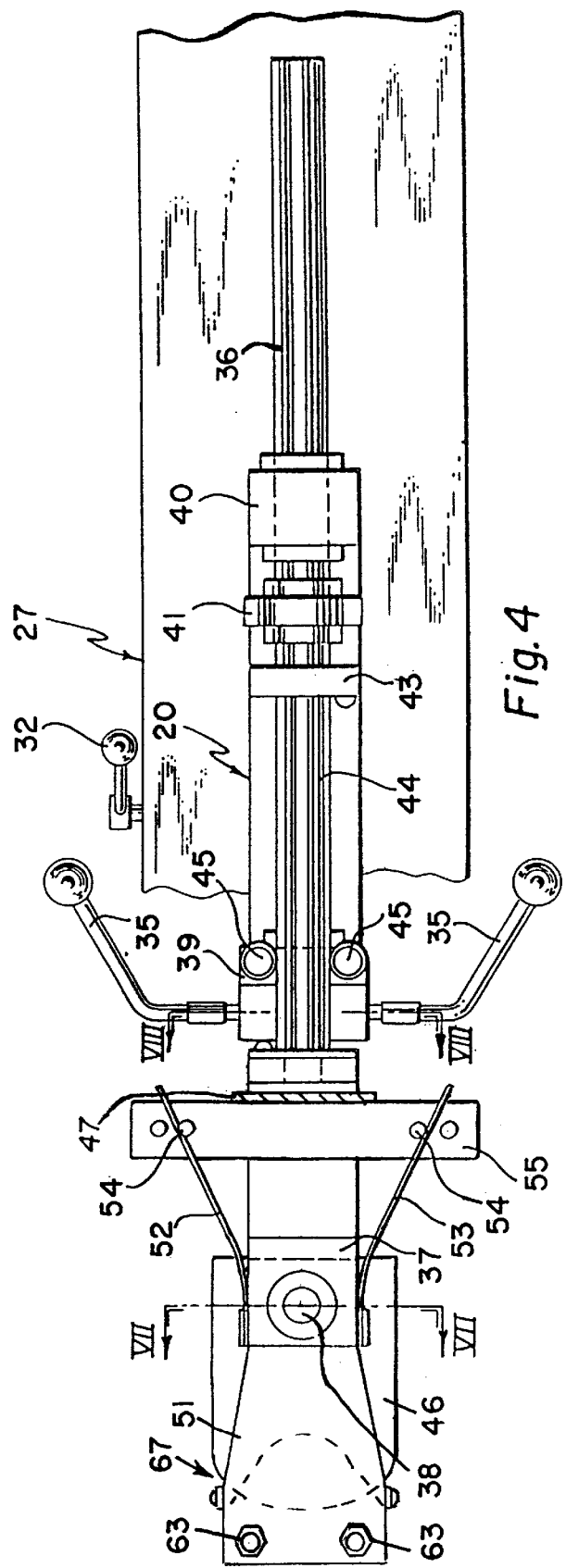
FIG. 4 is a bottom plan view of an adjusting mechanism forming part of the apparatus.
Figure 5:
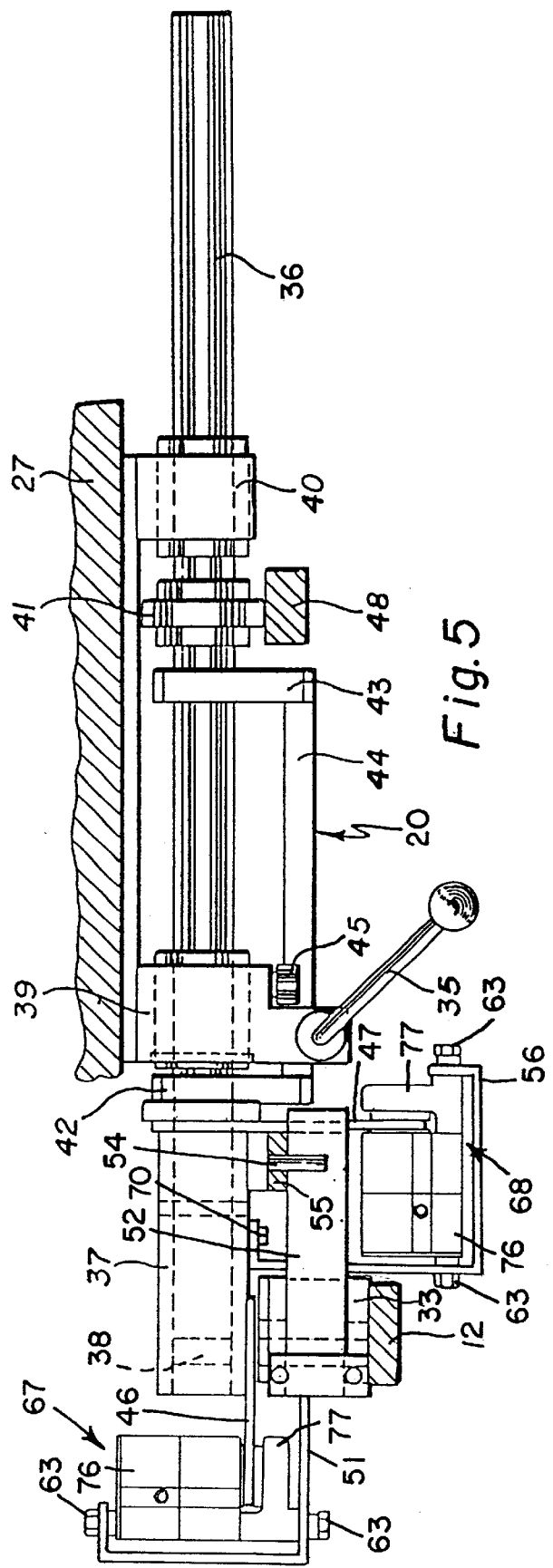
FIG. 5 is a front elevational view of the adjusting mechanism.

Referring next to FIGS. 2 and 3, which show further details of the apparatus, it can be seen that the center table 15 is mounted at an intermediate part of the frame 12, while the head table 14 and the end tables 16 are located at opposite ends of the center table. The support frame 12 is provided with an integral, box-like abutment 19 which holds the head table 14 and the center table 15 at a level which is substantial distance above the frame 12. An adjustment mechanism 20 lies between the frame 12 and the end table 16; it provides for the movement of the end table and holds the end table above the frame at the same general level as the head table 14 and the center table 15.

The main base 11 is provided with retractable wheels 21 which are omitted from FIG. 3 of the drawings. The jack 13 includes a screw-type actuator which is driven by and electric motor 22 and which operates through bell cracks 23 and 24. The head table 14 is hinged to the upper left hand corner of the abutment 19 and is held at a desired angle by a brace 25. The center table 15 is hinged in the same general location and is held in a selected position of angularity by an adjustable strut 26. The end table is hingedly connected to a suitable 27 and is held at a selected position of angularity to that suitable by a strut 28. The table 14 is locked by a handle 29, the center table 15 is locked in its position of angularity by a handle 31, and the table 16 is held in its position of angularity by a lock handle 32. Referring to FIG. 2, a hydraulic caliper brake, generally indicated by the reference numeral 67, operates to lock the end table 16 in its swing mode. A hydraulic caliper brake, generally indicated by the reference numeral 68, serves to lock the table 16 in its adjusted roll mode position, and the handle 35 serves to lock the table 16 in its adjusted position of sliding motion lengthwise of the apparatus. It is preferred that hydraulic caliper brakes be employed for locking the end table in its swing mode position and in its roll mode position. However, the deployment of a hydraulic caliper brake for locking the end table in either its swing mode position or in its roll mode position would be substantially beneficial.

Figure 6:
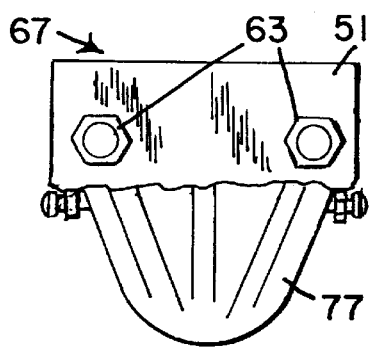
FIG. 6 is a side elevational view of one of the hydraulic caliper brakes of the adjusting mechanism.
Figure 6A:
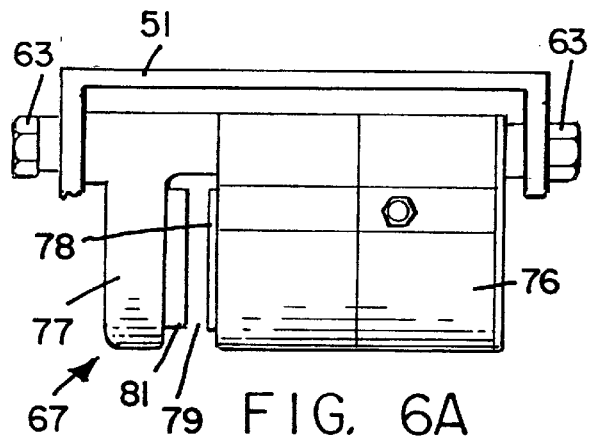
FIG. 6A is an end view of one of the caliper brakes, looking in the direction of arrow VI A of FIG. 6.

The hydraulic caliper brakes 67 and 68 are identical, brake 67 being shown in detail in FIGS. 6 and 6A. Each of the hydraulic caliper brakes 67 and 68 in the preferred embodiment is a model FS47F marketed by W. C. Branham Inc., River Falls, Wis. Hydraulic caliper brake 67 includes a housing 76 which contains a piston and a fixed caliper 77 to which is fixed a stationary brake pad 81. A movable brake pad 78 is fixed to the end of the piston. The disc 46 is located in a gap 79 between the pads 78 and 81. The piston and movable pad 78 are biased toward the pad 81 by a compression spring within the housing 76. Therefore, each of the brakes 67 and 68 is normally in its braking state wherein it applies a locking or braking force on its respective disc. The housing 76 has a port for receiving pressurized hydraulic fluid for actuating the piston to overcome the compression spring and to move the brake pad 78 away from the brake pad 81 to release the braking pressure on the disc 46. The hydraulic caliper brake 68 is actuated in the same manner to release the braking pressure on the disc 47.

Figure 10:
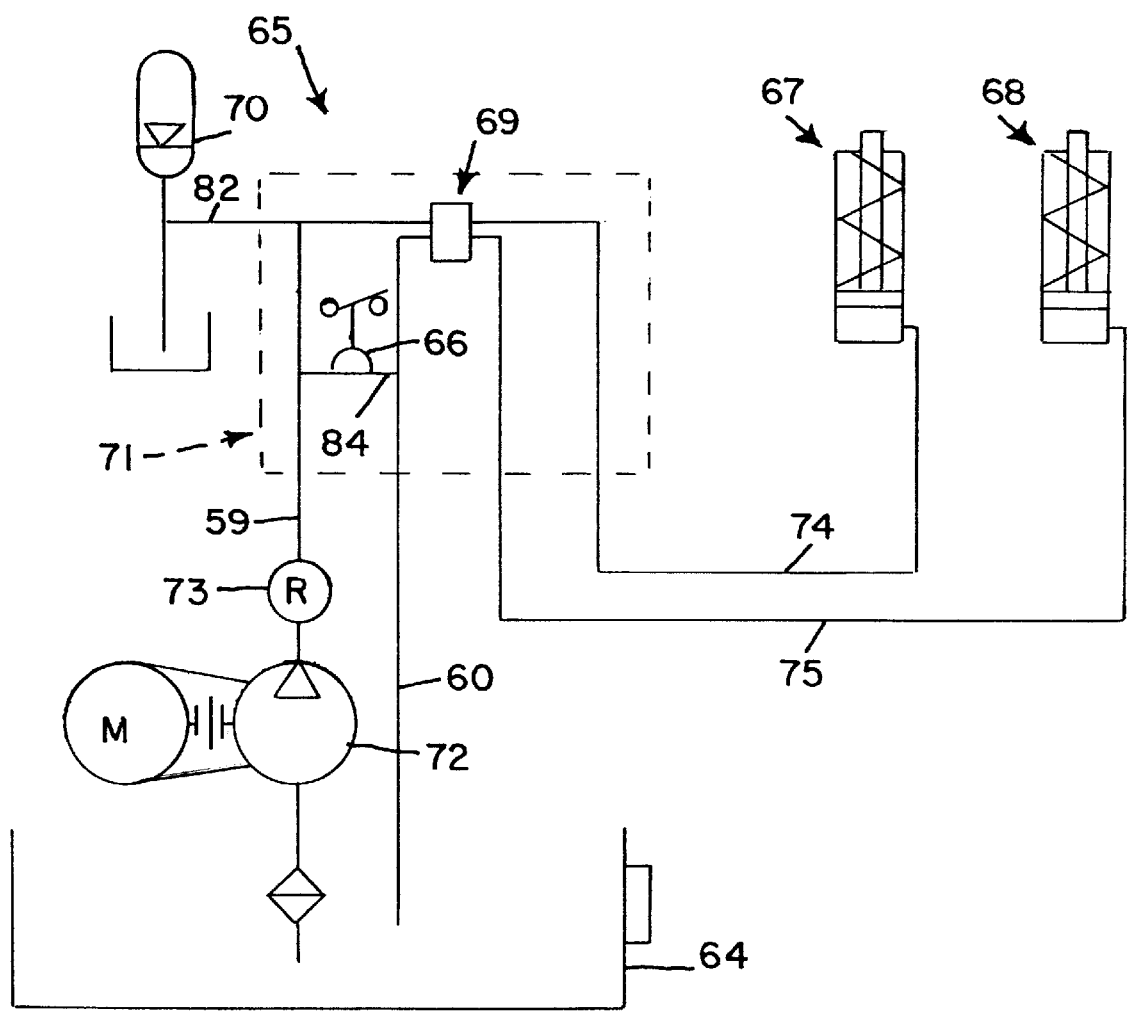
FIG. 10 is a schematic view of the hydraulic control apparatus for the hydraulic caliper brakes.

Referring to FIG. 10, the hydraulic control mechanism for the hydraulic caliper brakes 67 and 68 is generally indicated by the reference numeral 65. Hydraulic control mechanism 65 includes a reservoir 64 of hydraulic fluid, a pump 72, an accumulator 70 and a valve assembly, generally indicated by the reference numeral 71. The valve assembly 71 includes a pressure switch 66 and a bi-directional solenoid valve 69. Solenoid valve 69 is connected to the hydraulic caliper brakes 67 and 68 by hoses 74 and 75, respectively. The solenoid valve 69 is connected to the accumulator 70 by a hydraulic line 82 and to the reservoir 64 by a return hydraulic line 60. The pump 72 is connected to the line 82 by a hydraulic line 59. A relief valve 73 is located in line 59. Pressure switch 66 is located in a line 84 which is connected to lines 59 and 60. In the preferred embodiment of the invention, the solenoid valve 69 is a model No. 33G01C6RD1E20 manufactured by Nachi America Inc.

The hydraulic control apparatus 65 functions in accordance with the following descriptions.

Hydraulic fluid is pumped from the reservoir 64 to the accumulator 70 by the pump 72 until a predetermined upper valve hydraulic pressure is reached as determined by the pressure switch 66. When the hydraulic pressure falls below a lower valve hydraulic pressure, as sensed by the pressure switch 66, the pressure switch actuates the pump 72 to restore the hydraulic pressure to the upper value. The solenoid valve 69 has a first active position in which hose 74 is operatively connected to the accumulator 70 for actuating the piston in brake 67 for releasing the brake. The solenoid valve 69 has a second active position in which hose 75 is operatively connected to the accumulator 70 for actuating the piston in brake 68 for releasing the brake. The solenoid valve 69 has a neutral position in which neither of the hoses 74 and 75 is operatively connected to the accumulator. When the solenoid valve 69 returns to the neutral position from either of its active positions, hydraulic fluid is forced from the corresponding brake by the piston, which is, in turn, driven by the springs 79 back to the reservoir 64 through the solenoid valve 69 and return line 60. The solenoid valve 69 is actuated by a pressure switch, not shown, which is manually actuated by the operator of the orthopedic table. The brakes 67 and 68 are individually and selectively actuated by the operator for making "roll" mode and "swing" mode adjustments of the end table 16.

FIGS. 4–6A show the details of the adjusting mechanism 20. The rail 36 is in the form of an elongated cylindrical bar and constitutes one of the main elements of the adjusting mechanism. One end of the bar is locked in a secondary block 37. A pivot pin 38 is attached to the block and is pivotally carried in a primary block 33 which is fixedly attached to the support frame 12. The suitable 27 (forming part of the end table 16) is securely attached to two bearing blocks 39 and 40 in which the rail 36 is slidably carried, mounted on the rail 36 is a wheel 41. Fixed to the rail 36 are blocks 42 and 43 joined by a guide bar 44. The block 39 has two rollers 45 on either side of the rail 44 to guide it. The handle 35 locks the block 39 to the guide bar 44 to prevent the table 16 from moving longitudinally, that is to say, to lock the blocks 39 and 40 from longitudinal motion along the rail 36. When the hydraulic brake 67 is in its normal braking state it lockingly engages the outer periphery of a brake disc segment or plate 46. This prevents relative motion between the block 37 and the block 39, including movement about their mutual pivot pin 38. This, in turn, prevents the table 16 from swinging.

A disc-segment plate 47 is attached to the block 42 which is, in turn, attached to and rotates with the rail 36. The periphery of this plate is lockingly engaged by the hydraulic brake 68. The brake 68 is fixed to a bracket 56 by bolts 63. The bracket 56 is, in turn, fixed to the block 37 by bolts 70. When the brake 68 is in its normal braking state it prevents the rail 36 and blocks 42 and 43 with their guide bar 44 from rotating relative to the block 37 and the block 39. In other words, it stops the table 16 from operating in the "roll" mode.

Figure 7:
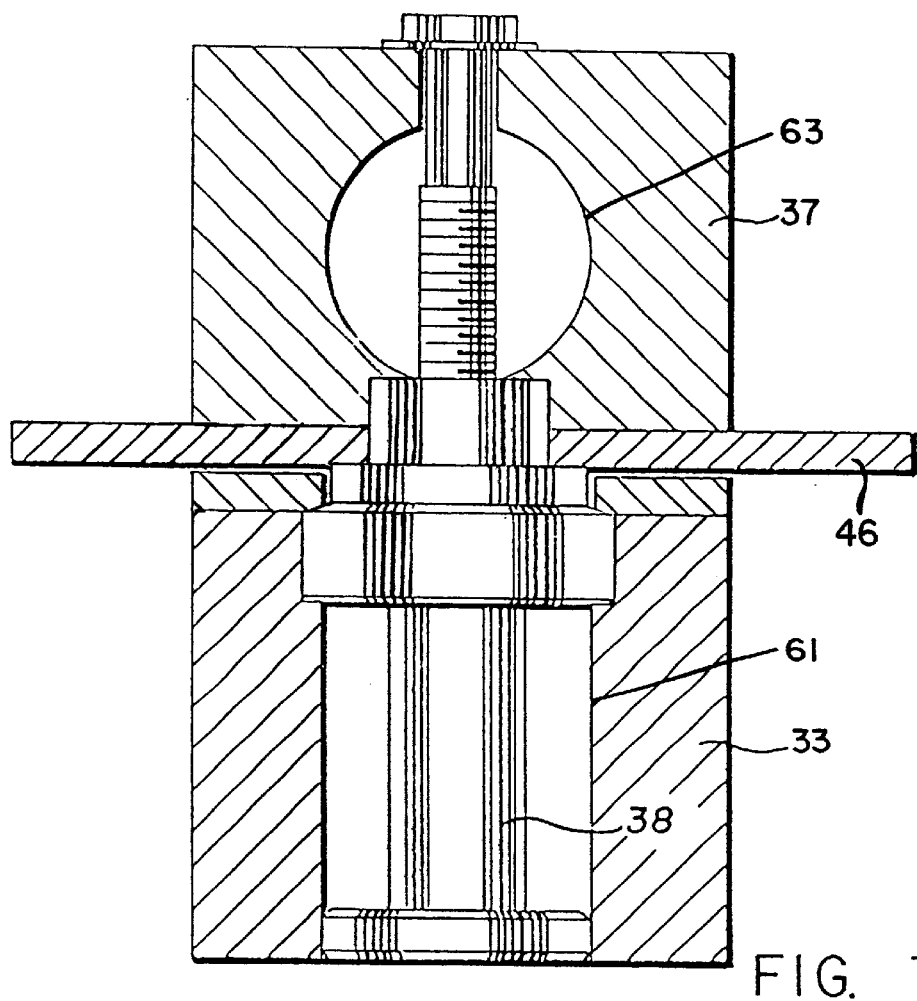
FIG. 7 is a vertical sectional view of the adjusting mechanism taken on the line VII—VII of FIG. 4.

Referring to FIG. 7, it can be seen that the mechanism for producing swinging motion of the end table 16 includes primary block 33 with a vertical bore 61 that is mounted on the support frame 12 adjacent the center table 15. The vertical pivot pin 38 lies in the bore 61 and is locked at its upper end to the secondary block 37. Secondary block 37 has a horizontal bore 62 in which the rail 36 is rotatably carried. The brake disc or plate 46 is fixed to the secondary block 37. The hydraulic brake 67 is fixed to a bracket 51 by bolts 63. The bracket 51 is, in turn, fixed to the support frame 12. The brake pads 78 of the brake 67 normally clamps the outer end of the disc or plate 46 to prevent rotation of the pin 38 in the bore 61 of the primary block 33. The brake 67 prevents rotation of the rail 36 within the bore 62.

Referring to FIG. 2, a crossbar 48 extends laterally across the support frame 12 and is provided with a broad horizontal upper surface. The wheel 41 is mounted concentrically of the rail 36 at a substantial distance from the pivot pin 38 and the periphery of this wheel engages the surface of the crossbar. Tertiary blocks 39 and 40 extend downwardly from the suitable 27 of the end table 16 and have aligned bores through which the rail 36 extends. The end table is thus capable of sliding longitudinally of the rail 36 without rotation thereabout, because of the restart offered by the guide bar 44 and the rollers 45. The locking means (including the handle 35) is carried on the block 39 to selectively prevent relative sliding movement between the rail 36 and the blocks 39 and 20.

It can be seen, then, that the adjustment mechanism 40 (which is located between the support frame 12 and the end table 16) includes the cylindrical rail 36 connected to the support frame for swinging movement about a vertical pivot at the end adjacent the center table 15. The end table is mounted on the rail for sliding movement lengthwise of the rail and the rail is mounted for rotary movement about its axis to produce the same movement of the end table 16.

Figure 8:
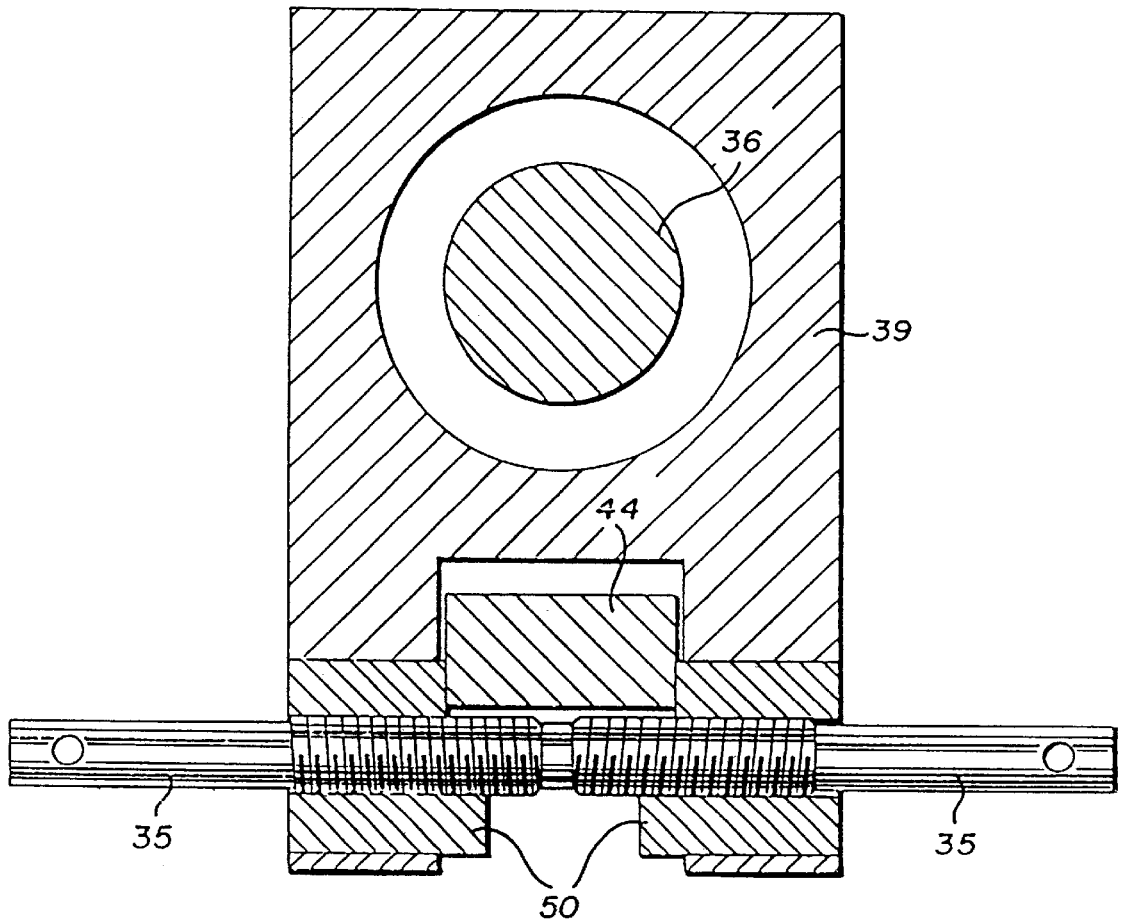
FIG. 8 is a vertical sectional view of the adjusting mechanism taken on the line VIII—VIII of FIG. 4.

FIG. 8 shows the manner in which the handles 35 threadedly engage the slides 50. The slide clamp on the guide bar 44 to prevent horizontal movement of the block 39 relative to the rail 36.

Referring again to FIGS. 4 and 5, it can be seen that there are two leaf springs 52 and 53, each having one end attached to the fixed block 39. The leaf springs swing under the block 37 and have their free ends engaged with pins 54 extending downwardly from a bar 55 and providing the swinging motion with a resilient resistance.

The operation and advantages of the invention will now be readily understood in view of the above discussion, It is the usual practice to make initial adjustments of the orthopedic apparatus 10 before placing the patient on the table and to make final adjustments with the patient in place. In some situations, this is necessary, because of the extreme angle in which the apparatus is used, to use raise which are provided (as is evident in FIG. 3) for straps to hold the patient on the tables in a secure position. The tables, of course, can be adjusted, as has been described above, by releasing the handles 29, 31, and 32. These serve to allow angular rotation (in the pitch mode) of the various tables about their hinges. In FIG. 3, the tables are shown in certain angular positions locked in place by the use of those same handles.

Once the head table 14 and the center table 15 have been mounted in their desired angular position and the height of the entire assemblage adjusted by use of the motor 22, it then may be necessary to adjust the end table 16. This adjustment can be accomplished first in a swinging mode by actuating the solenoid valve 69 to its first active position to release the brake 67. The "roll" mode adjustment is made by actuating the solenoid valve 69 to its second active position to release the brake 68. The longitudinal sliding mode adjustment is made by releasing the handle 35. After the position of the table in any of these modes have been selected, the solenoid valve 69 is returned to its neutral position so that the brakes 67 and 68 automatically reset to their normal braking states and the handle 35 is tightened so that all of the plates in the adjusting mechanisms are tightly grab and locked in their respective desired positions. In the case of the longitudinal adjustment of the table 16, the locking arrangement shown in FIG. 8 is sufficient to prevent movement of the table. In the other two modes, however, the weight of the patient makes the use of a very effective locking means imperative. The brakes 67 and 68 prevent the table 16 from twisting and turning after it has been locked in a desired position.

This is particularly important, because of situations of the type shown in FIG. 1 in which the patient 18 has been rotated into an extreme angular position and could be hurt if the table were not firmly locked. The brakes 67 and 68 insure that the swing and roll settings of the end table are secured consistently at a predetermined locking valve. The adjustments of the end table and subsequent fixing of the end table in the adjusted positions is accomplished quickly and easily and is substantially less tiring on the operator. More of the operator's attention and energy can be devoted to treatment of the patient.

Figure 9:
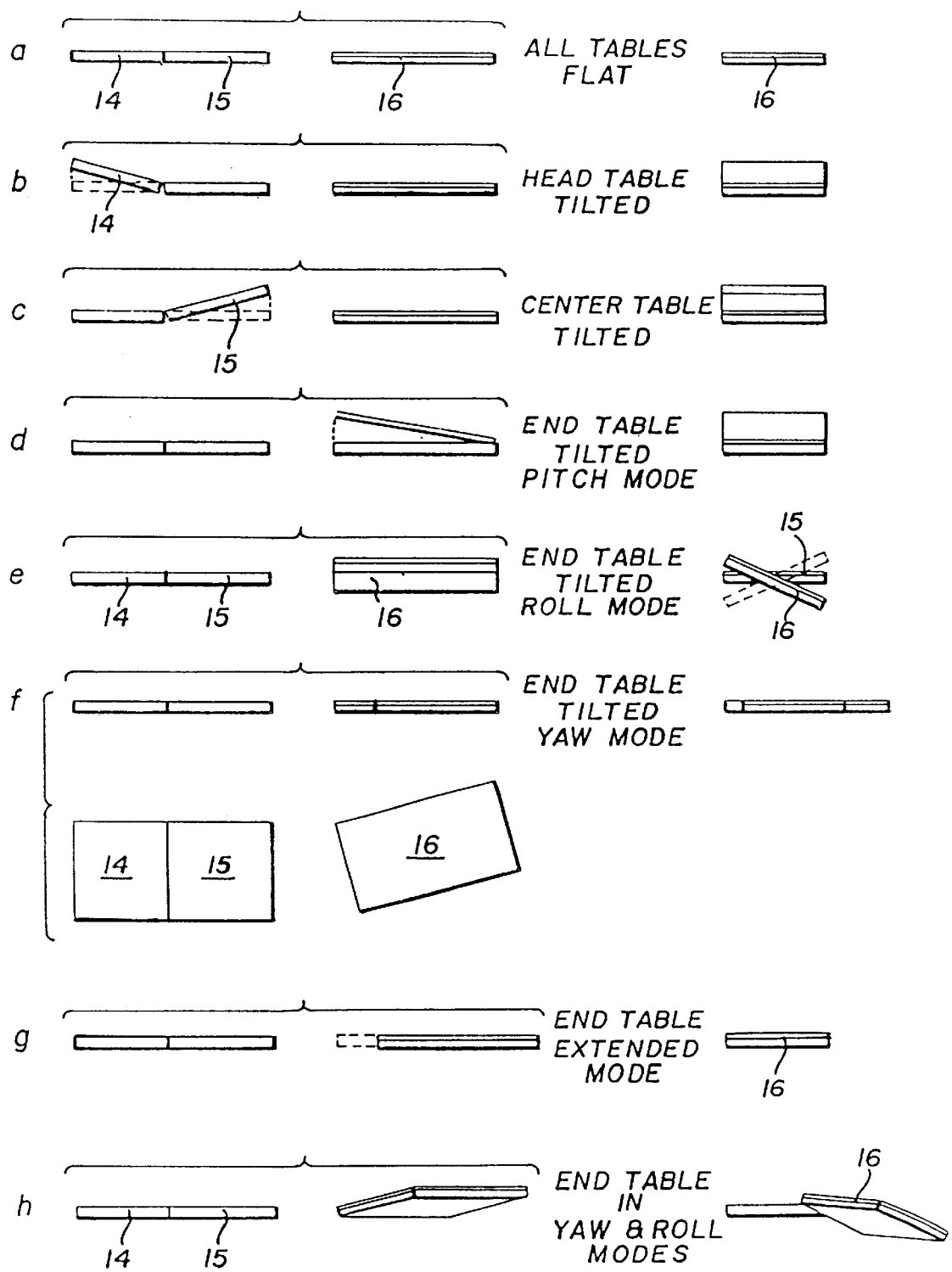
FIG. 9 is a chart showing various arrangements of the various tables in the apparatus.

It can be seen then, that by use of the present invention it is possible to obtain many manipulative positions of the patient and also to produce tension, particularly if the person has been locked to the center table 15 and the end table 16 by straps. Specifically, FIG. 9 shows some of the various position in which the table can be used. Referring to FIG. 9a, it can be seen that all tables are flat. In 9b, the head table 14 is tilted. In 9c, the center table 15 is tilted. In 9d, the end table 16 is tilted, i.e., adjusted in the pitch mode. In 9e, the end table is tilted in the roll mode. In 9f, the end table is tilted in the swing or yaw mode and it can be seen in this portion of the chart in the plan view. In 9g, the end table is in the extended or slide mode and has been moved longitudinally to a greater distance from the center table. In 9h, the end table 16 is shown as adjusted in both the yaw and the roll modes.

It can be seen, then, that the adjusting mechanism or control unit is built around a unique central bar made of solid high-quality steel running in a double linear ball race. This allows movement in three dimensions, so that motion can be produced around all the major axes. Incorporated in the design is a positive locking mechanism which allows a position be the held in any arc of movement or combination of movements. In addition, specific distraction can be applied independently or in combination with these movements to make three dimensional traction a treatment possibility. All of the controls of the table are accessible from each side, are easily reached, and can be precisely released and locked. The electrical motor drive for the table height enables the therapist regardless of height to effectively utilize body weight. This increases efficiency and reduces fatigue. In a commercial version of the invention, the end section 16 are adjustable in the horizontal plane to swing 25° on either side of the centerline. Furthermore, the end table was rotatable about the longitudinal axis to 15° on either side of the center. Of course, because the end table is slidably mounted on the rail 36, it is capable of being moved slidably back and forth along the longitudinal axis. In the commercial version, the wheels 21 are all operated from either side by levers.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

What is claimed is:

1. An orthopedic apparatus comprising:
   (a) a main base adapted to rest on the floor;
   (b) a support frame mounted on the main base;
   (c) a head table mounted on the support frame;
   (d) a center table mounted on the support frame;
   (e) a block connected to the support frame for swinging movement about a vertical axis adjacent the center table;
   (f) a horizontal plate fixed to one of said block and said support frame;
   (g) a first fluid brake fixed to the other of said block and said supported frame for engaging said horizontal plate and for selectively fixing, said block against pivoting about said vertical axis relative to said frame, said fire brake having a normal braking state, wherein said block is fixed against pivoting about said vertical axis relative to said frame and an actuated state, wherein said block is released to pivot about said vertical axis relative to said frame;
   (h) a horizontal cylindrical rail having a central longitudinal axis, said rail being mounted on said block for rotary motion about said central longitudinal axis;
   (i) a vertical plate fixed to one of said block and said rail;
   (j) a second fluid brake fixed to the other of said block and said rail for engaging said vertical plate and for selectively fixing said rail against rotary motion about said central longitudinal axis relative to said block, said second fluid brake having a normal braking state, wherein said rail is fixed against rotary motion about said central longitudinal axis relative to said block and an actuated state wherein said rail is released to rotate about said central longitudinal axis relative to said block;
   (k) an end table mounted on said rail for sliding adjustment along the central longitudinal axis of said rail so that said end table is capable of rotative adjustment about said central longitudinal axis and swing adjustment about said vertical axis; and
   (l) fluid control means for selectively activating said first and second fluid brakes, said fluid control means comprising:
      (1) a source of pressurized fluid; and
      (2) a solenoid valve operatively connected to said source of pressurized fluid and to said first and second fluid brakes, said solenoid valve having a first active state for connecting said first fluid brake to said source of pressurized fluid and actuating said first fluid brake without actuating said second fluid brake, a second active state for connecting said second fluid brake to said source of pressurized fluid and actuating said second fluid brake without actuating said first fluid brake and a neutral state wherein neither of said first and second fluid brakes is connected to said source of pressurized fluid, whereby accidental release of both fluid brakes is prevented.

* * * * *